US012321343B1

United States Patent
Mehta et al.

(10) Patent No.: US 12,321,343 B1
(45) Date of Patent: Jun. 3, 2025

(54) NATURAL LANGUAGE TO SQL ON CUSTOM ENTERPRISE DATA WAREHOUSE POWERED BY GENERATIVE ARTIFICIAL INTELLIGENCE

(71) Applicant: Morgan Stanley Services Group Inc., New York, NY (US)

(72) Inventors: Sanjit Vijay Mehta, Bengaluru (IN); Ashish Singh, Bengaluru (IN); Mayank Jain, Bengaluru (IN); Meet Singh, Bengaluru (IN); Satya Verma, Bengaluru (IN); Abhijit Anant Naik, Mumbai (IN); Mehak Mehta, Jersey City, NY (US); Vijay Kumar Butte, Princeton Junction, NJ (US); Sourabh Kumar Janghel, Bengaluru (IN); Aditya Ramesh, Bengaluru (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/046,934

(22) Filed: Feb. 6, 2025

(51) Int. Cl.
*G06F 16/242* (2019.01)
*G06F 16/2453* (2019.01)

(52) U.S. Cl.
CPC ...... *G06F 16/243* (2019.01); *G06F 16/24539* (2019.01)

(58) Field of Classification Search
CPC .............. G06F 16/243; G06F 16/24539
See application file for complete search history.

(56) References Cited

U.S. PATENT DOCUMENTS

| | | | |
|---|---|---|---|
| 12,265,517 B1* | 4/2025 | Woollen | G06F 16/24553 |
| 2007/0022109 A1* | 1/2007 | Imielinski | G06F 16/3344 |
| 2021/0397595 A1* | 12/2021 | Roitman | G06F 16/285 |
| 2022/0067591 A1 | 3/2022 | Patel et al. | |
| 2023/0367973 A1 | 11/2023 | Konam et al. | |
| 2024/0028312 A1 | 1/2024 | Gillman et al. | |
| 2024/0045893 A1 | 2/2024 | Reddy et al. | |

* cited by examiner

Primary Examiner — Cam Y T Truong
(74) Attorney, Agent, or Firm — Hunton Andrews Kurth LLP

(57) ABSTRACT

Systems and methods for translating natural language to SQL on a custom enterprise data warehouse powered by Generative AI. With an embodiment of the present invention, a natural language question may be converted to a meaningful and accurate database query, e.g., SQL query, relevant to tables existing in an enterprise data warehouse. An embodiment of the present invention is directed to a comprehensive approach of transforming a natural language query to a focused SQL query using domain specific data models across firmwide metadata systems and data systems. In response to a user query, an embodiment of the present invention performs metadata analysis, targeted data retrieval and then SQL generation. An embodiment of the present invention may apply data warehousing standards and guidelines followed in the enterprise and provide a plug-and-play type architecture and solution that is scalable to large warehousing and other systems.

14 Claims, 6 Drawing Sheets

Enter Prompt   Admin Utility

SEARCH COMMAND 🔍

SQL CODE                                                                  Codex

With_XXXXXX_loss_as_(select_key_acct_sum(XXX_Gain)_as_XXX_gain_from_dxp_dxxt_view_dxxxa_unrealized_gain_common_where_txt_acct_struc_lvl_#_Standard_Brokerage)Group_BY_key_acct_having_sum(XXX_gain) > 5000000)

612

Results                                                           610   (Search)

DATA SOURCE (MS Data Cloud (AI Data Cloud) x)

RECORDS (Advisors x) (ALG Name x) (Advisors x) (ALG Name x) (ALG Acct x)

(ALG Acct x)                                                                614

CONSTRAINTS (Clients x) (with x) (Brkrge Accts x) (with x) (Assets x) (between x) ($5M to $100M x) (with x)

Table Results  (4 columns)                                   ⊕ Add a column    616

| Name | Name | Name | Name |
|---|---|---|---|
| Jones, T. | Jones, M. | Jones, B, | Jones, C. |
| 3xxxG | 3xxxW | Bxxx2 | 2xxxN |
| $5414983182.60 | $878198330.60 | $5727972517.60 | Jones S. |
| 8 | 151 | 152 | Jones S. |

(Onboard Query)

Figure 6

NATURAL LANGUAGE TO SQL ON CUSTOM ENTERPRISE DATA WAREHOUSE POWERED BY GENERATIVE ARTIFICIAL INTELLIGENCE

FIELD OF THE INVENTION

The present invention relates generally to applying natural language processing to generate queries (e.g., SQL queries) on a custom enterprise data warehouse using Generative Artificial Intelligence ("Gen AI").

BACKGROUND

Current database query tools require searching across an entire system, which involves searching all database tables, metadata, etc. Oftentimes, search results will include unrelated data or incomplete results. In other systems, there may be separate databases for different business units, teams, etc. In this example, a search of one database may not result in a complete response.

Users, such as data scientists and analysists, experience difficulties in formulating a proper query. This may be a result of disparate systems and varying data storage models. Queries that return meaningful results with one system may not yield accurate results in another. Oftentimes, a significant amount of time and effort are required to find the necessary data elements. A general understanding of large language models is insufficient to factor proprietary data models and metadata. Moreover, standard driven approaches do not scale to organizational requirements. In particular, a large number of domains, sub-domains, tables and columns require extensive pre-processing and precise retrieval for accurate query generation.

Accordingly, there is a need for an improved system and method for generating queries, such as SQL queries, on a custom data warehouse.

SUMMARY

Systems and methods for natural language processing to generate queries, such as SQL queries, on a custom enterprise data warehouse are described.

According to an embodiment, a computer-implemented system comprises: a computer server comprising one or more processors; a memory component storing data tables; and non-transitory memory comprising instructions that, when executed by the one or more processors, cause the one or more processors to: receive, via a user interface, a user query in natural language format; extract, via an attribute extractor, a set of attributes from the user query; map, via a domain mapper, the set of attributes to a relevant domain and a relevant sub-domain; execute, via a retriever, a set of similarity searches limited to the relevant domain and the relevant sub-domain of a standardized metadata store to generate results comprising one or more tables and columns; wherein the set of similarity searches are performed by a semantic retriever, a hybrid retriever and a graph retriever executing in combination; apply, via a re-ranker, a re-ranking model to results of the set of similarity searches to generate a re-ranked result; generate, via a generator, a query statement using the re-ranked result; wherein the generator applies a set of prompt configurations; and transmit, via a communication network, the query statement with corresponding explanation to the user interface.

According to another embodiment, a computer-implemented method comprises the steps of: receiving, via a user interface, a user query in natural language format; extracting, via an attribute extractor, a set of attributes from the user query; mapping, via a domain mapper, the set of attributes to a relevant domain and a relevant sub-domain; executing, via a retriever, a set of similarity searches limited to the relevant domain and the relevant sub-domain of a standardized metadata store to generate results comprising one or more tables and columns; wherein the set of similarity searches are performed by a semantic retriever, a hybrid retriever and a graph retriever executing in combination; applying, via a re-ranker, a re-ranking model to results of the set of similarity searches to generate a re-ranked result; generating, via a generator, a query statement using the re-ranked result; wherein the generator applies a set of prompt configurations; and transmitting, via a communication network, the query statement with corresponding explanation to the user interface.

These and other advantages will be described more fully in the following detailed description.

BRIEF DESCRIPTION OF THE DRAWINGS

In order to facilitate a fuller understanding of the invention, reference is made to the attached drawings. The drawings should not be construed as limiting the invention, but are intended only to illustrate different aspects and embodiments of the invention.

FIG. 6 is an exemplary user interface, according to an embodiment of the present invention.

DETAILED DESCRIPTION

Figure 1:
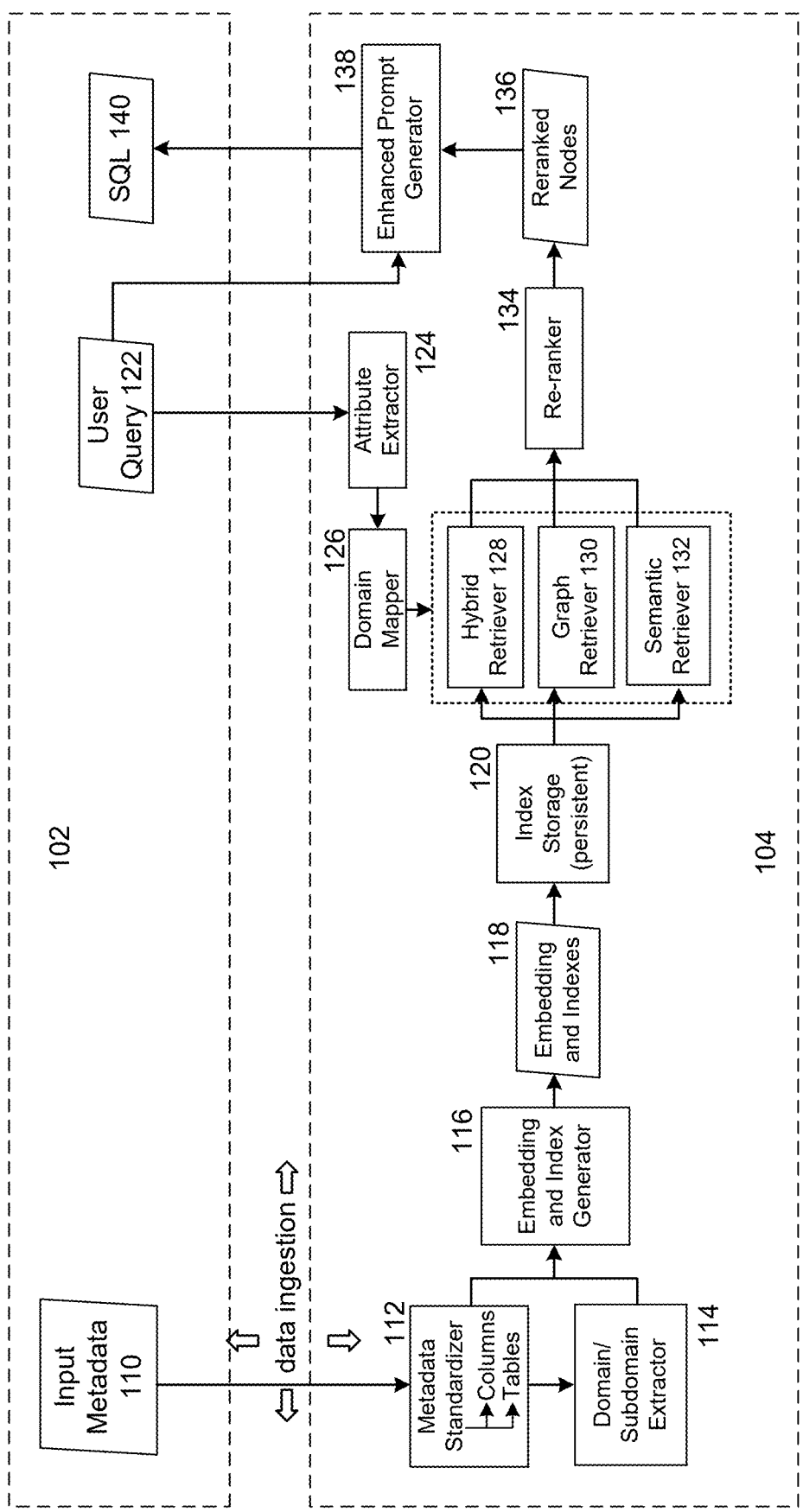
FIG. 1 is an exemplary natural language query architecture, according to an embodiment of the present invention.

Exemplary embodiments of the invention will be described in order to illustrate various features of the invention. The embodiments described herein are not intended to be limiting as to the scope of the invention, but rather are intended to provide examples of the components, use, and operation of the invention.

An embodiment of the present invention is directed to translating natural language to SQL on a custom enterprise data warehouse powered by Generative AI. With an embodiment of the present invention, a natural language question may be converted to a meaningful and accurate database query, e.g., SQL query, relevant to tables existing in an enterprise data warehouse.

An embodiment of the present invention is directed to a comprehensive approach of transforming a natural language query to a focused SQL query using domain specific data models across firmwide metadata systems and data systems. In response to a user query, an embodiment of the present invention performs metadata analysis, targeted data retrieval and precise SQL generation. While an embodiment of the present invention relates to SQL queries for illustration purposes, other database queries may be generated.

An embodiment of the present invention may run on custom enterprise metadata which is generally unseen to the Generative AI model. An embodiment of the present invention may apply data warehousing standards and guidelines followed in the enterprise and provide a plug-and-play type architecture and solution scalable to large warehousing and other systems.

An embodiment of the present invention seeks to enhance efficiency of data scientists and data analysts who currently spend a significant amount of time searching for the right data elements in the data warehouse on their own. This may increase the time to market for any feature pipeline or any curated dataset which may be required.

Various architectures and implementations may be supported. Commercialization opportunities may be realized by providing services to other enterprises where they can bring in their own metadata and leverage the framework of an embodiment of the present invention to retrieve relevant SQLs based on various questions.

An embodiment of the present invention may support a wide range of uses and applications including data analysis, feature engineering for analytics, reporting and machine learning. Other uses may include data processing pipelines for development and operationalization. Self-service data querying may support integration into existing applications. An embodiment of the present invention may support a wide range of users such as data analysts, data scientists, business and technology application users, data engineers, machine learning engineers, etc.

An embodiment of the present invention enables advanced capabilities for end-users including integration with end-user applications and platforms. Other benefits may include efficiency through accelerated analytics, development, debugging and optimization. In addition, an embodiment of the present invention may provide knowledge and metadata standardization by focusing on capturing knowledge and standardized metadata for consistency and accuracy. Scalability may be achieved by providing an ability to identify, learn and use correct data sources across users, applications, and platforms based on specific requirements.

Additional features may include optimized query (e.g., SQL query) generation by enriching metadata and using statistics, e.g., table statistics. With an embodiment of the present invention, complex query lineage may involve breaking the lineage of a complicated query to generate step-wise solution. Continuous metadata refinement may be applied through a feedback loop.

FIG. 1 is an exemplary natural language query architecture, according to an embodiment of the present invention. FIG. 1 illustrates an architecture that supports user/system inputs 102 and back-end analysis and processes 104. Metadata may be received as an input at 110 through a data ingestion process.

Various users, including data analysts, data scientists, engineers, programmers, etc. may interact with back-end analysis and processes 104 through a Network via various computing devices. Computing devices may include computers, laptops, workstations, kiosks, terminals, tablets, mobile devices, mobile phones, smart devices, etc.

Metadata Standardizer 112 may process the metadata obtained from the user and transforms it into a standardized format. For example, the metadata may be in a spreadsheet format or other similar document. Metadata Standardizer 112 may convert metadata in a specific format, e.g., table and column format, allowing the metadata to be uniformly structured, making it easier to manage, analyze, and utilize in subsequent stages.

Domain/Subdomain Extractor 114 may identify and extract primary domains and subdomains relevant to a specific structure, including Table wise and Column wise data. Domain/Subdomain Extractor 114 may further facilitate categorizing the data, which supports accurate retrieval and processing.

Embedding and Index Generator 116 may generate Embedding and Indexes for each subdomain created at 118. For each subdomain, an embedding may be created and then its indexes may be built, enabling fast and scalable search operations. Embeddings may include vectors that represent various types of data in a manner that can be easily processed. In addition, an embedding model may be applied to convert the data into a vector representation for machine learning applications. Embedding and Index Generator 116 structures data in a way that optimizes retrieval performance.

Index Storage 120 may store the generated indexes in a structured and efficient manner, enabling quick access and retrieval. The use of persistent storage ensures that the indexes remain intact and accessible even after system reboots or experiences failures, providing reliability and long-term data retention.

A user query may be received at 122. The user query may be submitted by various users including data scientist, data scientists, application users, data engineers, machine learning engineers, etc. For example, the user query may include a query in natural language format. The query may be provided by a user through text, voice or other input. The query may be received as an input from various systems, sources, interfaces, devices, etc.

Attribute Extractor 124 may extract key attributes and features from the user query. The attributes may be used to refine the search process by identifying elements within the query, which may be used for filtering, ranking, processing, etc. This extraction enhances the ability to understand and respond accurately to user requests.

After extracting attributes from the user query, Domain Mapper 126 may map the identified attributes to specific domains and/or subdomains. This mapping may associate the query with the correct domain knowledge, ensuring that the search and retrieval processes are aligned with the relevant context or subject area. The retrieval process may involve multiple retrievers that operate simultaneously, sequentially or in parallel.

Hybrid Retriever 128 may support a hybrid search that executes a search technique that combines two or more search algorithms to improve the relevance of search results. For example, a hybrid search may combine Keyword based searching with Embedding based searching. Keyword-based retrieval may represent a part of the Hybrid Retriever that uses keyword-based search (e.g., BM25). For vector or semantic search, the system may simultaneously use a vector-based retrieval method, such as embeddings, to capture the semantic meaning of the query. The embeddings may then be compared with indexed embeddings to find similar or contextually related results. Hybrid Retriever 128 may combine the results from these methods, weighing the contribution from each method differently depending on the domain and type of query. With Hybrid Retriever 128, a comprehensive set of results that are contextually relevant and precise may be produced.

Graph Retriever 130 may operate on a graph-based data structure, where nodes represent entities (e.g., documents, concepts, terms, etc.), and edges represent relationships between these entities. Using the domain information provided by the domain mapper, the Graph Retriever 130 focuses on the relevant parts of the graph, ensuring that the search is conducted within the appropriate context. Graph Retriever 130 may also explore the relationship between the entities, enabling it to retrieve data that is not just directly related to the query but also contextually connected through various paths in the graph. This approach is particularly powerful for complex queries where understanding the interplay between different entities is crucial for accurate retrieval.

Semantic Retriever 132 may convert the query and data into vector representations. For example, Semantic Retriever 132 may include a Faiss/LangChain Retriever as well as other types of retrievers. These vectors may capture the semantic meaning of the information, allowing for more context-retrieval. With the domain-specific information provided by Domain Mapper 126, Semantic Retriever 132 may prioritize on vectors that are relevant to the identified domain, improving retrieval accuracy. This method is effective for large-scale data, where efficient and fast retrieval is crucial.

Re-ranker 134 may refine the process for improved results. For example, retrieved nodes may be sent to Re-ranker 134 to filter out retrieved nodes and select nodes having highest similarity to the query. Accordingly, Re-ranker 134 may be applied to reorder the results to present the most relevant information at the top.

Re-ranked Nodes 136 represents the output of the re-ranker process, shown by 134. These nodes may contain the reordered data on the basis of relevance score (or other metric), optimized for relevance and accuracy based on a re-ranking strategy.

Enhanced Prompts may be generated by Enhanced Prompt Generator 138 by combining original User Query 122 with a set of instructions and the re-ranked nodes. Using the query, instructions and/or information from the re-ranked nodes, an embodiment of the present invention may then generate a SQL query, shown by 140, designed to retrieve the desired data from the database. This query may be carefully crafted to ensure accuracy and relevance to the user's need. Alongside the SQL query, an embodiment of the present invention may also produce an explanation that details how the SQL query was constructed, including the selection of tables, columns, conditions, etc. Other types of database queries may be supported.

According to an exemplary implementation, an embodiment of the present invention may use retrieval augmented generation (RAG) along with Prompt Engineering and Hybrid Search as well as advance RAG techniques such as GraphRAG. RAG may represent a technique for enhancing accuracy and reliability of generative AI models with facts fetched from external sources. Prompt Engineering may involve creating and refining natural language instructions to guide AI models to produce an output. Prompt Engineering may further involve developing and optimizing prompts to efficiently use language models. An implementation may be built using a Python package of frameworks such as LangChain, llamaindex and other frameworks. LangChain provides integration of large language models (LLMs) into applications. Llama index may represent a framework for building context-augmented generative AI applications with LLMs including agents and workflows. In addition, OpenAI GPT4-turbo and other variations may be used for inference and OpenAI Large 3 Embedding model or other models, for example. Other implementations with various other components and services may be realized.

An illustrative example may involve a preprocessing stage, a user query and an execution flow.

At the preprocessing stage, input metadata may be collected from various firmwide metadata systems and then converted into a standardized format by Metadata Standardizer 112. The standard format may include: table name, meaning, description, domain, sub domain, along with column name meaning description, datatype, nullability, audit details, etc. The standardized metadata may be passed to Domain/Subdomain Extractor 114 to create a grouping/mapping of tables with respect to domains and/or subdomains. For example, a mapping may include: Index 1—Core Reference & Party, Index 2—Core Reference & Acct, Index 3—Core Reference & Party, Index 4—Financials & Asset, Index 5—Core Reference & FA, etc. These Indexes may be created by Embedding and Index Generator 116 and then stored in a persistent Index Storage 120 (e.g., Redis) so the data does not need to be generate again and may be used in the process further.

An Execution Flow may pass User Query 122 to Attribute Extractor 124 that extracts relevant attributes from the User Query 122. An exemplary User Query may include "Write a SQL to get primary Financial Advisor for all the parties." In this example, the extracted attributes may include: "Primary Financial Advisor" and "Party." The extracted attributes may be mapped to relevant domains and sub-domains by Domain Mapper 126 which in this case includes Core Reference Domain and Party and Financial Advisor sub-domains. A SQL query is one example, other database queries may be supported.

As shown in FIG. 1, a set of retrievers may run similarity searches. For example, Hybrid Retriever 128, Graph Retriever 130 and Semantic Retriever 132 may run similarity searches on indexes identified by Domain Mapper 126 and may find the tables and columns matching the attributes in the user query—TABLE_PARTY (PARTY_ID, other columns), TABLE_FA (FA_ID, PRIMARY Indicator, etc.), TABLE_FA_CMPNS, TABLE_PARTY_MAIL_ADDRESS, etc.

These retrieved results may then be passed to Re-ranker 134 along with the user query to provide more accurate tables and columns which will be relevant for the user query-which in this case comes from TABLE_PARTY & TABLE_FA. Accordingly, the other two tables are less relevant to the user query.

The Re-Ranked tables and columns may be passed to Enhanced Prompt Generator 138 which may be embedded with an enhanced prompt to form SQL statements, considering the data warehousing policies of the firm. The generated SQL may then be sent to the user on the same prompt, as shown by 140.

Figure 2:
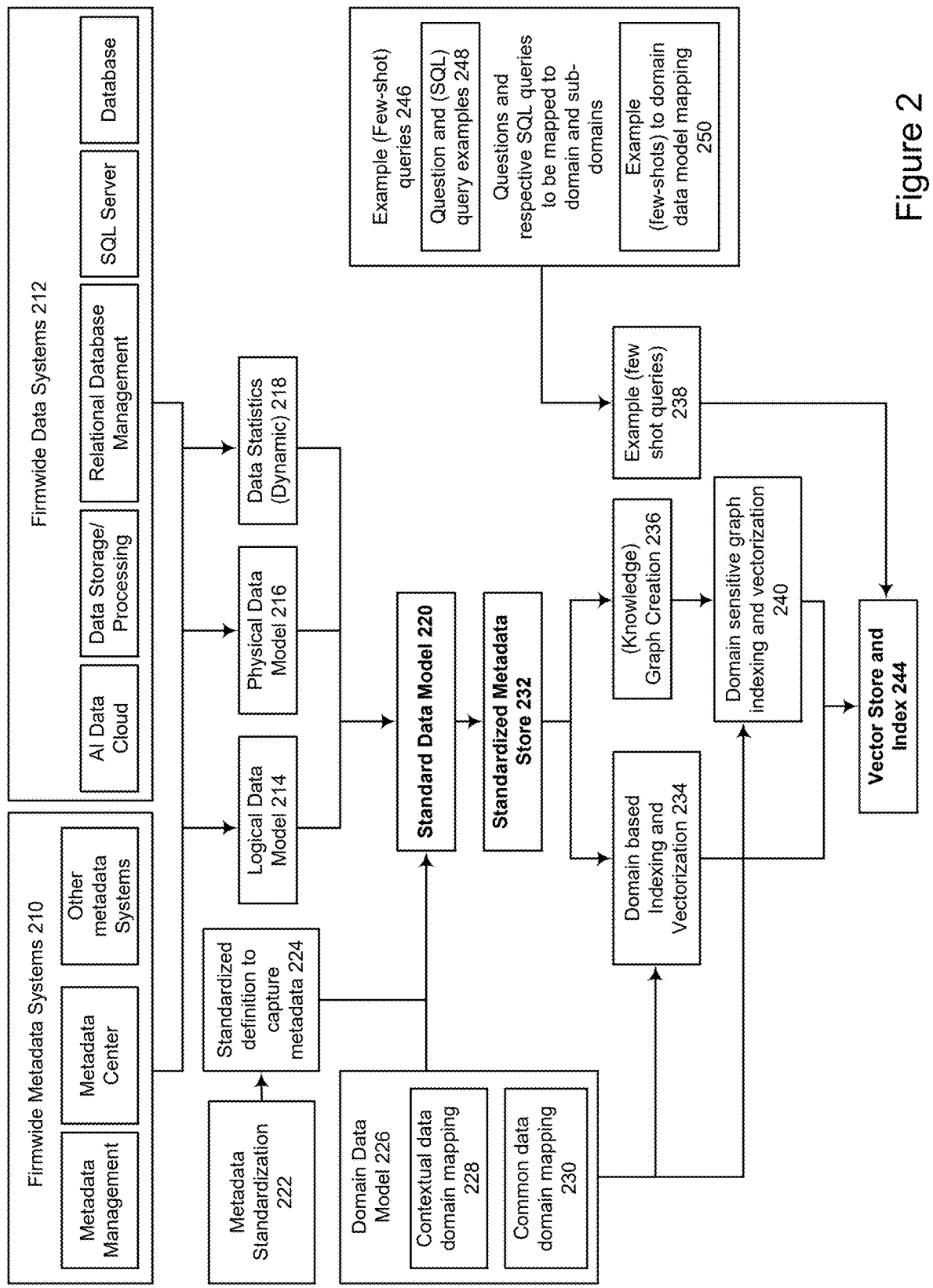
FIG. 2 is an exemplary flowchart, according to an embodiment of the present invention.

FIG. 2 is an exemplary flowchart, according to an embodiment of the present invention. FIG. 2 illustrates how metadata is retrieved, organized and then stored. Firmwide metadata systems 210 may include various platforms and systems that manage and store various forms of metadata. Firmwide data systems 212 may include various services and systems that are used by an entity across multiple locations and regions. Firmwide data systems 212 may include: AI data cloud systems, data storage and processing frameworks, relationship database management systems for large scale data warehousing and analytics, servers, databases, etc.

The data from these various sources may be received and managed through Logical Data Model 214, Physical Data Model 216 and Data Statistics 218. For example, Data Statistics may include descriptive statistics, partitioning details, data quality reports, etc. Metadata components may be organized in a Standard Data Model as shown by 220. Standard Data Model 220 may utilize standardized definitions to capture metadata from various disparate sources as shown by 224. Standardized definitions may be based on metadata standardization best practices and standards, as shown by 222.

Domain Data Model 226 may support contextual data domain mapping 228 and common data domain mapping 230 and serve as inputs to Standard Data Model 220. Contextual data domain mapping 228 may be specific to the data in question while common data domain mapping 230 may refer to firmwide data. Domain Data Model 226 may also support standardized domain identifiers. For example, various entities, business units, teams and other users may use different terms for the same element, e.g., client, party, stakeholder, etc.

For example, an entity may use a Domain Data Model 226 to define or divide an entire domain into small subdomains. A "demographics" domain may include subdomains represented as: party demographic, account demographic, party to account relationship, household demographic, etc. A "financials" domain may include subdomains represented as: trading activity, cash activity, financial holdings, asset holdings, externally held assets, etc.

Standardized Metadata Store 232 may support domain based indexing and vectorization 234 and knowledge graph creation 236.

As shown in FIG. 2, Domain Data Model 226 and Knowledge Graph Creation 236 may generate Domain sensitive graph indexing and vectorization 240.

Example queries 246 may include question and query examples 248 and example domain data model mapping 250. This may include questions and respective SQL queries to be mapped to domains and sub-domains. Example queries 246 may represent few shot queries that include example queries that the system can learn from.

Example queries 238 may be stored in Vector Store and Index 244 which may represent a document store, chunk store, graph store, vector store and indexer.

Figure 3:
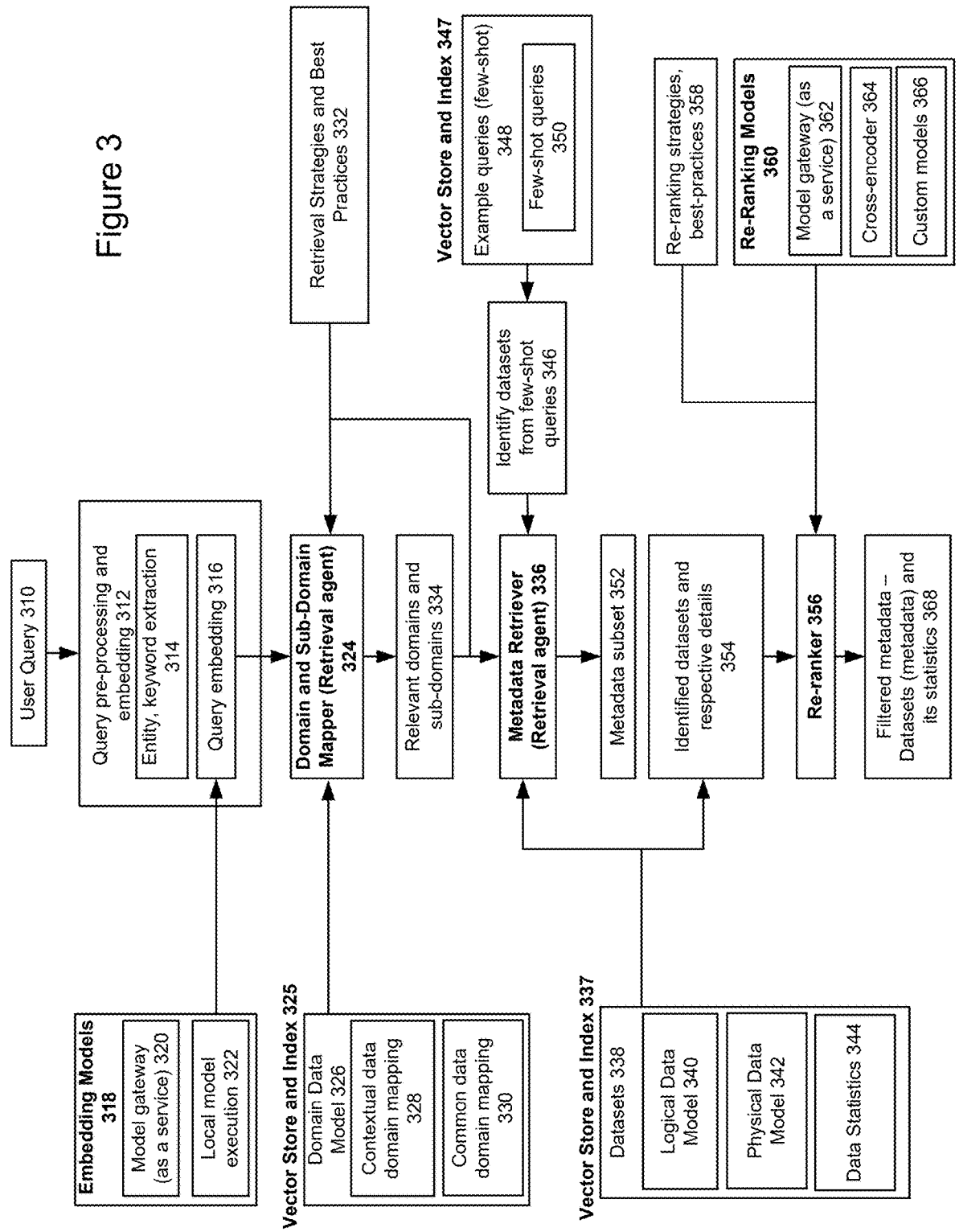
FIG. 3 is an exemplary flowchart, according to an embodiment of the present invention.

FIG. 3 is an exemplary flowchart, according to an embodiment of the present invention. FIG. 3 illustrates how data is retrieved in response to a natural language query.

User Query may be received as an input at 310. Query pre-processing and embedding may be performed at 312. This may include entity and keyword extraction 314 and query embedding 316. Embedding Models 318 may be applied. Embedding Models 318 may include model gateway (as a service) 320 and local model execution 322. Other types of models may be applied.

Domain and Sub-domain mapper 324 may be applied as a retrieval agent. Domain and Sub-domain mapper 324 may access Vector Store and Index 325 which may apply Domain Data Model 326 that includes: contextual data domain mapping 328 and common data domain mapping 330. Vector Store and Index 325 may represent part of vector (embedding) store and index that focuses on domain data model. Domain and Sub-domain mapper 324 may apply Retrieval Strategies and Best Practices 332 including semantic, hybrid and graph retrieval processes.

Figure 5:
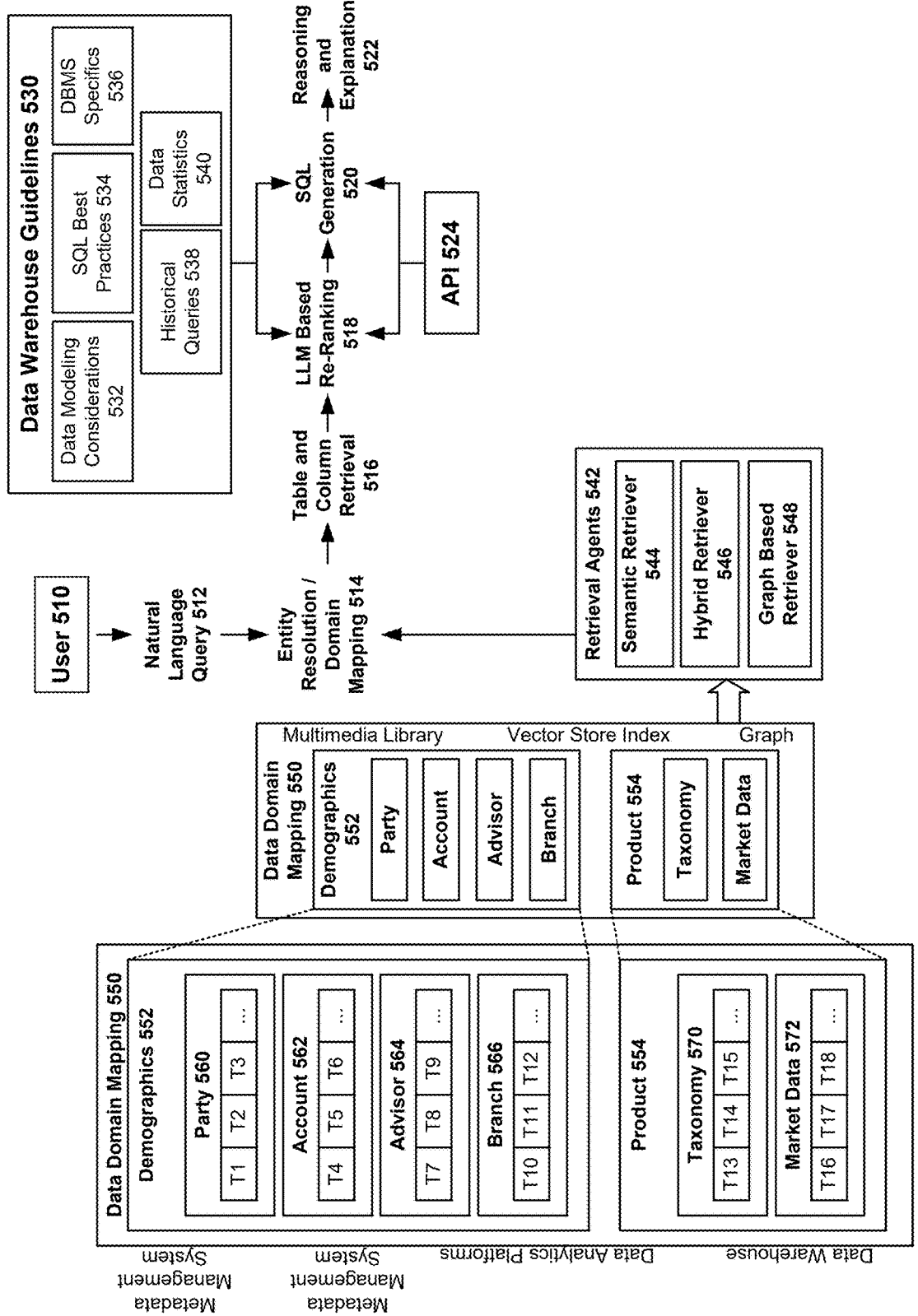
FIG. 5 is an exemplary flowchart, according to an embodiment of the present invention.

Relevant domains and sub-domains may be identified at 334. Metadata Retriever 336 may be applied as a retrieval agent. Metadata Retriever 336 may filter metadata (e.g., index, vector store) that aligns to identified domains and sub-domains. If a query relates to demographics, instead of retrieving the entire metadata, a subset such as demographic may be retrieved using data domain mapping. Demographic domain may have subdomains such as party, account, advisor, and branch with each subdomain having corresponding tables. In this example, metadata associated with Account subdomain from Demographic domain may be retrieved and the others may be ignored. Additional details are shown in FIG. 5.

Vector Store and Index 337 may represent a part of the vector (embedding) store and index that focuses on underlying datasets. This may include tabular indexing, graph indexing and other forms of indexing. Datasets 338 may include Logical Data Model 340, Physical Data Model 342 and Data Statistics 344. Logical Data Model 340 may include conceptual table and concepts; Physical Data Model 342 may include actual data stores; and Data Statistics 344 may be mapped to logical and physical data models.

Vector Store and Index 347 may represent a part of the vector (embedding) store and index that focuses on few shot queries (and its chunk, embeddings, etc.). Vector Store and Index 347 may include example queries 348, such as few-shot queries 350. Datasets from few-shot queries may be identified at 346.

Metadata subset may be identified at 352. Datasets (e.g., tables, columns) and respective details (e.g., comprehensive metadata) may be identified at 354. Re-ranker may be applied at 356. Re-ranking strategies and best practices may be applied by 358. Re-ranking Models 360 may include: model gateway 362, cross-encoder 364 and custom models 366. Re-ranker 356 may generate filtered metadata including datasets (metadata) and statistics at 368.

Figure 4:
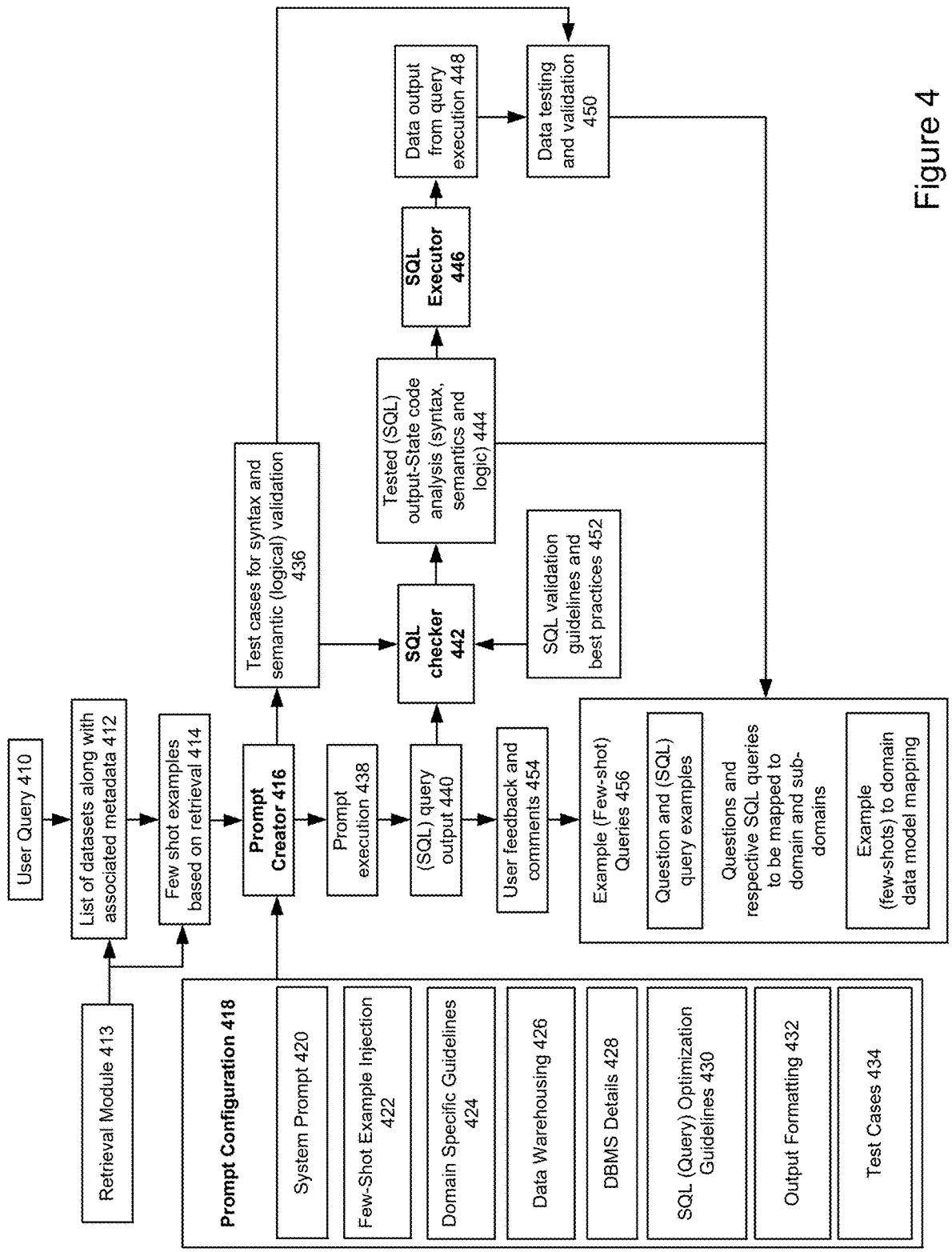
FIG. 4 is an exemplary flowchart, according to an embodiment of the present invention.

FIG. 4 is an exemplary flowchart, according to an embodiment of the present invention. FIG. 4 illustrates a SQL query generation process. In response to a user query shown at 410, Retrieval Module 413 may provide the relevant inputs to 412 and 414. A list of datasets may be provided with associated metadata at 412. Few shot examples may be identified at 414. Prompt Creator 416 may receive inputs from Prompt Configuration 418. Prompt Configuration 418 for query and generation may include: System Prompt 420, Few Shot Example Injection 422, Domain Specific Guidelines 424, Data Warehousing 426, DBMS Details 428, SQL Query Optimization Guidelines 430, Output Formatting 432 and Test Cases 434. While an embodiment of the present invention relates to SQL queries for illustration purposes, other database queries may be supported.

Domain Specific Guidelines 424 may include concepts, terminologies, dimensions, facts, acronyms, and other functional axioms. For example, an entity may have a specific business unit that uses unique contextual terms. Domain Specific Guidelines 424 may define various idiosyncrasies associated with a particular business unit or specific domain. Data warehousing 426 may also include data modeling and naming guidelines. For example, each entity may have a data modeling team that sets standards on how tables and columns are named, how data is structured, how primary keys are declared, what data types are available and other guidelines. DBMS Details 428 may be optional. This may be relevant when queries are generated for specific databases or sources. Query optimization guidelines 430 may also include best practices and comments that may be DBMS dependent or independent. These guidelines may ensure that queries are optimally generated to operate on minimal data in an efficient manner without adversely impacting other users and systems. Output Formatting 432 may also include reasoning and explanation. Test Cases 434 may be relevant to syntax and semantic validation.

Prompt Creator 416 may then generate test cases for syntax and semantic validation as shown by 436. The test cases may be tested and validated at 450.

Prompt Execution 438 may generate a query output 440, such as a SQL query output. SQL checker 442 may apply SQL validation guidelines and best practices 452.

Analysis may be performed on the SQL query output as shown by 444. Analysis may relate to syntax, semantics, logic, etc. SQL Executor 446 may generate a data output from query execution at 448. Data testing and validation may be performed at 450.

Feedback from validations may be applied back to enrich the few shot repository, as shown by 454. Example queries 456 may include: question and query examples. Question and respective SQL queries may be mapped to domain and sub-domains.

FIG. 5 is an exemplary flowchart, according to an embodiment of the present invention. As shown in FIG. 5, User 510 may submit a natural language query 512 that is received by Entity Resolution and Domain Mapping 514. At 516, relevant table and column data may be retrieved. LLM-based re-ranking may be performed at 518 with SQL generation at 520 through API 524. Reasoning and explanation may be provided as shown by 522.

Data Warehouse Guidelines 530 may be used in LLM based Re-ranking 518 and SQL Generation 520. Data Warehouse Guidelines 530 may support Data Modeling Considerations 532, SQL Best Practices 534, DBMS Specifics 536, Historical Queries 538 and Data Statistics 540.

Domain and sub-domain descriptions may be retrieved by Entity Solution and Domain Mapping 514. Retrieval Agents 542 may include Semantic Retriever 544, Hybrid Retriever 546 and Graph Based Retriever 548.

In this example, Data Domain Mapping 550 may include Demographics 552 and Product 554. Demographic 552 may include: Party 560, Account 562, Advisor 564, Branch 566. Product 554 may include: Taxonomy 570 and Market Data 572. This may represent data preparation that may be refreshed at predefined intervals.

While the process of the Figures illustrate certain steps performed in a particular order, it should be understood that the embodiments of the present invention may be practiced by adding one or more steps to the processes, omitting steps within the processes and/or altering the order in which one or more steps are performed. Additional details for each step are provided below.

An embodiment of the present invention is directed to generating feature stores. Within a business unit of an entity, a set of users may run the same or similar queries. This may be relevant when the query is for a time frame (e.g., month) and would need to be run periodically. In response, an embodiment of the present invention may generate a feature that may be available for the set of users as well as other users. The same feature may also be iterated on and further improved/updated. Various versions may be available to certain users, business units, teams. This promotes efficiency in resources and time.

An embodiment of the present invention may use the structured metadata to create or convert a relationship database into a graph database. For example, the structured metadata may be used to create entities and relationships and then generate a corresponding graph database or other output in another format.

FIG. 6 is an exemplary user interface, according to an embodiment of the present invention. User may input a query in natural language at 610. Other inputs may be supported including voice or input from other systems/ interfaces. AI service (NLQ) may generate SQL at 612. SQL may be broken down into components for customization as shown by 614. In this example, results may include data source, records and constraints. In addition, a user may review and modify as per respective requirements. Table Results may be provided at 616. Other formats, query execution and data retrieval may be further supported.

The User Interface of FIG. 6 may interface and communicate with various users via a communication network. Other users and integrations may be supported.

The system components are exemplary and illustrative, an embodiment of the present invention may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

The illustrated system may be communicatively coupled to various Data Stores as well as remote storages. Data stores may also store and maintain source code, reports, performance data, historical data, etc. These storage components may include any suitable data structure to maintain the information and allow access and retrieval of the information. The storage may be local, remote, or a combination. The storage components may have back-up capability built-in. Communications with the storage components may be over a network or communications may involve a direct connection between the various storage components. The storage components may also represent cloud or other network based storage.

The system may be implemented in a variety of ways. Architecture within the system may be implemented as hardware components (e.g., module) within one or more network elements. It should also be appreciated that architecture within the system may be implemented in computer executable software (e.g., on a tangible, non-transitory computer-readable medium) located within one or more network elements. Module functionality of architecture within the system may be located on a single device or distributed across a plurality of devices including one or more centralized servers and one or more mobile units or end user devices. The architecture depicted in the system is meant to be exemplary and non-limiting. For example, while connections and relationships between the elements of system are depicted, it should be appreciated that other connections and relationships are possible. The system described may be used to implement the various methods herein, by way of example. Various elements of the system may be referenced in explaining the exemplary methods described herein.

Networks may be a wireless network, a wired network or any combination of wireless network and wired network. Networks may further include one, or any number of the exemplary types of networks operating as a stand-alone network or in cooperation with each other. Networks may utilize one or more protocols of one or more network elements to which it is communicatively coupled. Networks may translate to or from other protocols to one or more protocols of network devices. Although Networks may be depicted as one network for simplicity, it should be appreciated that according to one or more embodiments, Networks may comprise a plurality of interconnected networks, such as, for example, a service provider network, the Internet, a cellular network, corporate networks, or even home networks, or any of the types of networks mentioned above.

Data may be transmitted and received via Networks utilizing a standard networking protocol or a standard telecommunications protocol. For example, data may be transmitted using protocols and systems suitable for transmitting and receiving data. Data may be transmitted and received wirelessly or in some cases may utilize cabled network or telecom connections or other wired network connection.

While the figures illustrate individual devices or components, it should be appreciated that there may be several of such devices to carry out the various exemplary embodiments. The system may communicate using any mobile or computing device, such as a laptop computer, a personal digital assistant, a smartphone, a smartwatch, smart glasses, other wearables or other computing devices capable of sending or receiving network signals. Computing devices may have an application installed that is associated with the illustrated system.

Those skilled in the art will appreciate that the diagrams discussed above are merely examples of a system and a method for applying natural language processing to generate SQL queries on a custom enterprise data warehouse using Gen AI and are not intended to be limiting. Other types and configurations of networks, servers, databases and personal computing devices (e.g., desktop computers, tablet computers, mobile computing devices, smart phones, etc.) may be used with exemplary embodiments of the invention. In addition, other types of database queries may be supported.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of devices whereby a user may interact with a network that transmits and delivers data and information used by the various systems and methods described herein. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art.

In some embodiments, the computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device.

The servers, databases, and personal computing devices described above may include at least one accelerated processing unit, such as a GPU or FPGA, and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C, C++, dBase, Forth, HTML, Android, IOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor.

Although the embodiments of the invention have been described herein in the context of a particular implementation in a particular environment for a particular purpose, those skilled in the art will recognize that its usefulness is not limited thereto and that the embodiments of the invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A computer-implemented system comprising:
a computer server comprising one or more processors;
a memory component storing data tables; and
non-transitory memory comprising instructions that, when executed by the one or more processors, cause the one or more processors to:
receive, from a user via a user interface, a user query in natural language format to retrieve the data tables;
in response to the receiving the user query:
extract, via an attribute extractor, attributes from the user query;
map, based on indexing and vectorization via a domain mapper, the attributes to a relevant domain and a relevant sub-domain included in a standardized metadata store, wherein the standardized metadata store is generated by a standard data model using contextual data domain mapping and common data domain mapping, wherein the standard data model is based on physical data model and data statistics from a plurality of firmwide metadata systems;
execute, via a retriever, a set of similarity searches limited to the relevant domain and the relevant sub-domain of the standardized metadata store to generate results comprising one or more tables and columns, wherein the set of similarity searches are performed by a semantic retriever, a hybrid retriever and a graph retriever executing in combination, wherein the executing the set of similarity searches includes running the similarity searches on indexes identified by the domain mapper to find the tables and columns matching the attributes in the user query, wherein the retriever further retrieves, from few shot queries, datasets including the tables and columns;
apply, via a re-ranker, a re-ranking model to the results of the set of similarity searches to generate a re-ranked result including re-ranked tables and columns;
generate, via a generator, a query statement using the re-ranked result embedded with an enhanced prompt by applying a set of prompt configurations, wherein the set of prompt configurations comprise two or more of: domain specific guidelines, query optimization guidelines, and output formatting; and
transmit, on the same prompt via a communication network, the query statement with corresponding explanation including constraints to the user interface.

2. The computer-implemented system of claim 1, wherein the standard data model is based on logical data model.

3. The computer-implemented system of claim 1, wherein the standardized metadata store applies metadata standardization across a plurality of firmwide metadata systems and firmwide data systems.

4. The computer-implemented system of claim 1, wherein the standardized metadata store applies domain based on indexing and vectorization.

5. The computer-implemented system of claim 1, wherein the query statement comprises a structured query language (SQL) query.

6. The computer-implemented system of claim 1, wherein the generator comprises a query checker that applies validation and guidelines.

7. The computer-implemented system of claim 1, wherein the corresponding explanation comprises: data sources and records.

8. A computer-implemented method comprising steps of:
receiving, from a user via a user interface, a user query in natural language format to retrieve data tables stored in a memory;
in response to the receiving the user query:
extracting, via an attribute extractor executed by a computer system, attributes from the user query;
mapping, based on indexing and vectorization via a domain mapper executed by the computer system, the attributes to a relevant domain and a relevant sub-domain included in a standardized metadata store, wherein the standardized metadata store is generated by a standard data model using contextual data domain mapping and common data domain mapping, wherein the standard data model is based on physical data model and data statistics from a plurality of firmwide metadata systems;
executing, via a retriever executed by the computer system, a set of similarity searches limited to the relevant domain and the relevant sub-domain of the standardized metadata store to generate results comprising one or more tables and columns, wherein the set of similarity searches are performed by a semantic retriever, a hybrid retriever and a graph retriever executing in combination, wherein the executing the set of similarity searches includes running the similarity searches on indexes identified by the domain mapper to find the tables and columns matching the attributes in the user query, wherein the retriever further retrieves, from few shot queries, datasets including the tables and columns;
applying, via a re-ranker executed by the computer system, a re-ranking model to the results of the set of similarity searches to generate a re-ranked result including re-ranked tables and columns;
generating, via a generator executed by the computer system, a query statement using the re-ranked result embedded with an enhanced prompt by applying a set of prompt configurations, wherein the set of prompt configurations comprise two or more of: domain specific guidelines, query optimization guidelines, and output formatting; and
transmitting, on the same prompt via a communication network, the query statement with corresponding explanation including constraints to the user interface.

9. The computer-implemented method of claim 8, wherein the standard data model is based on logical data model.

10. The computer-implemented method of claim 8, wherein the standardized metadata store applies metadata standardization across a plurality of firmwide metadata systems and firmwide data systems.

11. The computer-implemented method of claim 8, wherein the standardized metadata store applies domain based on indexing and vectorization.

12. The computer-implemented method of claim 8, wherein the query statement comprises a structured query language (SQL) query.

13. The computer-implemented method of claim 8, wherein the generator comprises a query checker that applies validation and guidelines.

14. The computer-implemented method of claim 8, wherein the corresponding explanation comprises: data sources and records.

* * * * *